United States Patent
Finlow-Bates

(10) Patent No.: US 10,938,579 B2
(45) Date of Patent: Mar. 2, 2021

(54) RADIO FREQUENCY IDENTIFICATION TAG ONE-WAY AUTHENTICATION USING A ONE-TIME PASSWORD PAD AND A BLOCKCHAIN

(71) Applicant: Keir Finlow-Bates, Kangasala (FI)

(72) Inventor: Keir Finlow-Bates, Kangasala (FI)

(*) Notice: Subject to any disclaimer, the term of this patent is extended or adjusted under 35 U.S.C. 154(b) by 255 days.

(21) Appl. No.: 16/289,691

(22) Filed: Mar. 1, 2019

(65) Prior Publication Data
US 2020/0280454 A1 Sep. 3, 2020

(51) Int. Cl.
*H04L 9/32* (2006.01)
*H04L 29/06* (2006.01)
*G06F 21/44* (2013.01)

(52) U.S. Cl.
CPC ............ *H04L 9/3273* (2013.01); *G06F 21/44* (2013.01); *H04L 9/3228* (2013.01); *H04L 9/3239* (2013.01); *H04L 63/0838* (2013.01); *H04L 2209/38* (2013.01); *H04L 2209/805* (2013.01)

(58) Field of Classification Search
CPC . H04L 9/3228; H04L 9/3239; H04L 2209/38; H04L 2209/805; G06F 21/44
See application file for complete search history.

(56) References Cited

U.S. PATENT DOCUMENTS

| | | |
|---|---|---|
| 8,994,505 B2 | 3/2015 | Tuttle |
| 9,224,083 B2 | 12/2015 | Wyatt |
| 2014/0229387 A1* | 8/2014 | Chow ................ G06K 7/10366 705/71 |
| 2016/0098723 A1 | 4/2016 | Feeny |
| 2019/0182049 A1* | 6/2019 | Juels ..................... H04L 9/3247 |
| 2019/0244215 A1* | 8/2019 | Watanabe ............. H04L 9/3236 |
| 2020/0052899 A1 | 2/2020 | Finlow-Bates |
| 2020/0242313 A1* | 7/2020 | Lemsitzer ........... H04L 63/0823 |

OTHER PUBLICATIONS

Ya-Ling et al. An Improved RFID Privacy Protection Scheme Based on Hash-chain 2010 International Conference on Logistics Engineering and Intelligent Transportation Systems IEEE (Year: 2010).*
Wang et al. Blockchain-based Mutual Authentication Security Protocol for Distributed RFID Systems 2018 IEEE Symposium on Computers and Communications (ISCC) IEEE (Year: 2018).*

* cited by examiner

Primary Examiner — David J Pearson

(57) ABSTRACT

A radio frequency identification device, or RFID tag, has an antenna attached to or formed on a microchip. The microchip usually comprises low power fixed or programmable logic and a small quantity of persistent memory. As many RFID tags are powered by radio waves transmitted from an RFID tag reader, the low power fixed or programmable logic is often not capable of performing complex cryptographic calculations required for digital signing to provide one-way authentication of the tag. In the present disclosure a system and method are presented for enabling a low overhead challenge and response using a one-time password pad comprising passwords on the RFID tag and a blockchain to record a use of the passwords. Methods are also disclosed for securely replacing the one-time password pad, and using the RFID tag in combination with a blockchain to provide provenance information for the RFID tag.

17 Claims, 12 Drawing Sheets

FIG. 6

800 Smart contract

802 Procedure: return current access key for supplied identifier

804 Procedure: publish new access key

806 Procedure: check access key validity based on data entry

808 Procedure: return total number of access keys published

810 Procedure: revoke tag based on supplied identifier

814 Procedure: accept token payment

816 Procedure: offer token payment

818 Procedure: publish encrypted new access key

820 Procedure: send encryption key to given address

822 Data: access key array

824 Data: seed

826 Data: used key list

FIG. 8

RADIO FREQUENCY IDENTIFICATION TAG ONE-WAY AUTHENTICATION USING A ONE-TIME PASSWORD PAD AND A BLOCKCHAIN

TECHNICAL FIELD

This disclosure relates to the field of radio frequency identification devices (RFID), and more specifically to apparatuses, computer software, and a blockchain for secure one-way authentication of RFID tags without a need for complex on-tag cryptography.

BACKGROUND

Two common forms of authentication are one-way authentication and mutual authentication. In mutual authentication two parties prove to each other that they both know a shared secret. In one-way authentication a first party proves to a second party that only they know a secret without revealing the secret, typically through asymmetric key cryptography and digital signing.

In the field of RFID, mutual authentication schemes are common, but for reasons explained below, one-way authentication of an RFID tag to any second party is currently beyond the scope of low power cheap RFID tags.

The RFID tag is a low power and low complexity microchip connected to a radio antenna, and is often powered through energy provided by radio waves transmitted from an RFID reader.

The RFID tag may be used to track goods in transit through a supply chain by, for example, scanning the RFID tag with RFID readers at various points as the goods are received or transferred by different parties, and writing a record comprising data received by scanning to a shared database for later retrieval and/or analysis.

The RFID tag commonly identifies itself by responding with a Unique Identifier (UID), a transponder identifier (TID), an electronic product code (EPC), or some other identification code, henceforth referred to as an identifier. However, it is trivial to copy or clone the RFID tag if the identifier is known. Using the identifier is therefore not a secure or reliable method for identifying the RFID tag and therefore providing one-way authentication of the RFID tag.

The RFID tag, produced at low cost for labeling a commercial product where the RFID tag is thrown away with packaging for the commercial product, typically comprises a low power fixed or programmable logic and a small quantity of persistent memory.

Currently RFID tag technology is not capable of performing the complex extensive computations required for advanced cryptographic digital signing using signature algorithms such as the Elliptic Curve Digital Signature Algorithm (ECDSA), the Digital Signing Algorithm (DSA), or other common digital signing algorithms associated with digital certificates.

A common method for providing one-way authentication in the field of computing is through signing a nonce (number used only once) using a digital signing algorithm and symmetric key cryptography, utilizing a public key and a private key. A challenger supplies the nonce, a challengee signs the challenge nonce with the private key, returns a signature in the form of a signed challenge nonce and optionally the public key derived from the private key. The challenger may then use the public key to verify the signature and hence the identity of the challengee, and one-way authentication is provided for.

As the RFID tag does not have a capacity to digitally sign a challenge it is difficult to securely verify the authenticity of the RFID tag.

In U.S. Pat. No. 7,791,451 Li et. al. teach a method for authentication between devices, including RFID devices, using a hash chain. However, the method provided is for mutual authorized authentication, and does not teach open identification or one-way authentication for the RFID tag, which may be read by many different participants, for example participants in a product supply chain.

It is therefore an intention of the present disclosure to address the problem of enabling the RFID tag to securely and uniquely identify itself to multiple unconnected or untrusted parties through one-way authentication without a need for complex cryptography on the RFID tag.

SUMMARY

In accordance with the present disclosure, a solution is provided for reliably and securely identifying an RFID tag using an RFID reader and a blockchain through one-way authentication, when the RFID tag is too low powered to be able to perform onboard complex cryptographic operations such as digital signing or asymmetric key cryptography.

In some embodiments, the RFID reader may be enabled to write to as well as read from the RFID tag.

In some embodiments, the RFID tag may comprise a tag logic and a tag memory. The tag memory may comprise a one-time password pad and optionally a counter, and the tag logic may be configured to return an entry from the one-time password pad on receiving a request from a RFID reader.

In some embodiments, the tag memory may be implemented using non-volatile memory (NVM), and the tag logic may be implemented in an array of logic gates.

In some embodiments, the one-time password pad may be implemented in the tag memory whereby the tag memory is divided into one or more memory sectors, and whereby one or more access keys are required to access the one or more memory sectors. The one-time password pad may comprise the one or more access keys.

In some embodiments, each of the one or more memory sectors may comprise a preimage of an access key required to access each of the one or more memory sectors. Thus an access key may be derived from a corresponding preimage stored in a memory sector protected by the access key.

In some embodiments the access key may be derived from the preimage by applying a cryptographic hash function to the preimage. Those skilled in the art will know that cryptographic hash functions are designed to ensure that producing an output from an input is relatively simple, however reverse-engineering the input from the output is computationally infeasible. Examples of such cryptographic hash functions include: BLAKE, BLAKE2, Race Integrity Primitives Evaluation Message Digest (RIPEMD), Secure Hash Algorithm 1 (SHA-1), Secure Hash Algorithm 2 (SHA-2), and Scrypt.

In some embodiments, the RFID reader may be configured to submit the request to the RFID tag, receive the entry from the RFID tag, and determine a valid identity of the RFID tag by comparing an expected value with the entry. The request may comprise the access key, and the expected value may comprise the preimage of the access key. The RFID reader may determine the valid identity by confirming that the access key is derived from the preimge using the cryptographic hash function, thus authenticating the tag.

In some embodiments, the RFID tag may comprise a counter, and the tag logic may increment or decrement the value in the counter on returning the entry.

In some embodiments, the one-time password pad may comprise a hash chain. In other embodiments the one-time password pad may be derived from a hash chain.

In some embodiments the tag logic may be further configured to replace the one-time password pad with a new one-time password pad in response to receiving the new one-time password pad from the RFID reader. The tag logic may subsequently, or prior to replacing the one-time password, reset the value stored in the counter to an initial value.

In some embodiments, the initial value may be one of: zero, one, or a total number of entries in the one-time password pad.

In some embodiments, the tag memory may comprise an access key list, the request may comprise a key selected from the access key list, and the tag logic may be further configured to return the entry stored in a location in the tag memory corresponding to the key selected.

In some embodiments, the access key list may comprise an offset subset of the one-time password pad. For example, a first entry of the access key list may comprise a second entry of the one-time password pad, a second entry of the access key list may comprise a third entry of the one-time password pad, and so on, and a last entry of the access key list may comprise a nonce.

In some embodiments, the tag logic may be configured to return the entry from the one-time password pad without receiving a key from the access key list, provided the entry is in a specified subset of the one-time password pad. For example, if the one-time password pad is a hash chain, the tag logic may be configured to return all entries from the hash chain except a seed value for the hash chain and a first hash of the seed value.

In some embodiments, the tag logic may be configured to return the entry from the one-time password pad if the request comprises a prior entry from the one-time password pad.

In some embodiments, the system may comprise a blockchain.

In some embodiments, the RFID reader may request an identifier from the RFID tag, and may then search for a record indexed by the identifier on the blockchain, said record comprising an access key. The RFID reader may then retrieve the access key from the record, and use the access key to retrieve data from the memory sector in the RFID tag protected by the access key.

In some embodiments, the RFID reader may retrieve the preimage from the memory sector, and may verify that the access key for the memory sector is derived from the preimage.

In some embodiments, in response to authenticating the RFID tag, the RFID reader may publish a transaction comprising the access key and the preimage on the blockchain. In other embodiments the transaction may further comprise: a timestamp, an identifier for the RFID reader, the identifier of the RFID tag, a historical record of prior transactions retrieved from the RFID tag, and/or sensor data retrieved from the RFID tag. The transaction may be published through a proxy, for example a blockchain node.

In some embodiments, the system may comprise a monitor. The monitor may be a device or a computer program that regularly scans content of the blockchain to detect if certain data has been reported.

The monitor may hold a list of access keys for the memory sectors of the RFID tag, and the monitor may be further configured to carry out steps comprising: detecting, on the blockchain, a transaction comprising an access key from the list of access keys and a corresponding previously unpublished preimage; and, after a predetermined delay, the monitor may publish a new record on the blockchain, the new record comprising one or more of: the identifier and a previously unpublished key from the list of access keys.

In some embodiments, the monitor may comprise a smart contract running on the blockchain.

In some embodiments, the monitor may comprise a blockchain node and associated blockchain data monitoring code which, when executed, causes the monitor to execute steps described above.

In some embodiments, the monitor may be configured to publish the new record in encrypted form, wherein a decryption key for the new record is released to the RFID reader on receipt of a cryptocurrency payment to the monitor.

In some embodiments, the RFID tag may further comprise a counter, and the RFID tag may be further configured to increment or decrement the counter each time one of a plurality of memory sectors is read for a first time using a corresponding one of a plurality of access keys.

In some embodiments, the transaction and/or the new record may further comprise a value of the counter.

In some embodiments a validity of a one-time password pad may be established for one-way authentication of an RFID tag by: generating a data array wherein each element of the data array is derived from a corresponding password from the one-time password pad by applying a hash function to the corresponding password; publishing the data array on a blockchain; publishing an entry from the one-time password pad on the blockchain; retrieving the entry and the data array from the blockchain; applying the hash function to the entry to produce an output; and confirming that the data array comprises an element equal to the output.

In some embodiments, the one-time password pad may be derived from a hash chain using a hash function.

In some embodiments, a confirmation transaction may be published on the blockchain. The confirmation transaction may comprise one or more of: an identifier for the RFID tag, the entry, and the element.

Those skilled in the art will further appreciate the advantages and superior features found in this disclosure together with other important aspects thereof on reading the detailed description that follows in conjunction with the drawings.

BRIEF DESCRIPTION OF THE DRAWINGS

The components in the figures are not necessarily to scale and units or modules within the figures are not necessarily arranged in absolute geometric relation, emphasis instead being placed upon illustrating the principles of the present disclosure. In the figures, like reference numerals designate corresponding parts throughout the different views.

FIG. 6 is a diagram illustrating an embodiment of a one-time password pad and verification preimages stored in a MIFARE Classic® or MIFARE Plus® RFID tag memory structure.

FIG. 8 is a block diagram illustrating a smart contract for managing a use of a one-time password pad, in accordance with an embodiment of the present disclosure.

DETAILED DESCRIPTION

Figure 1:
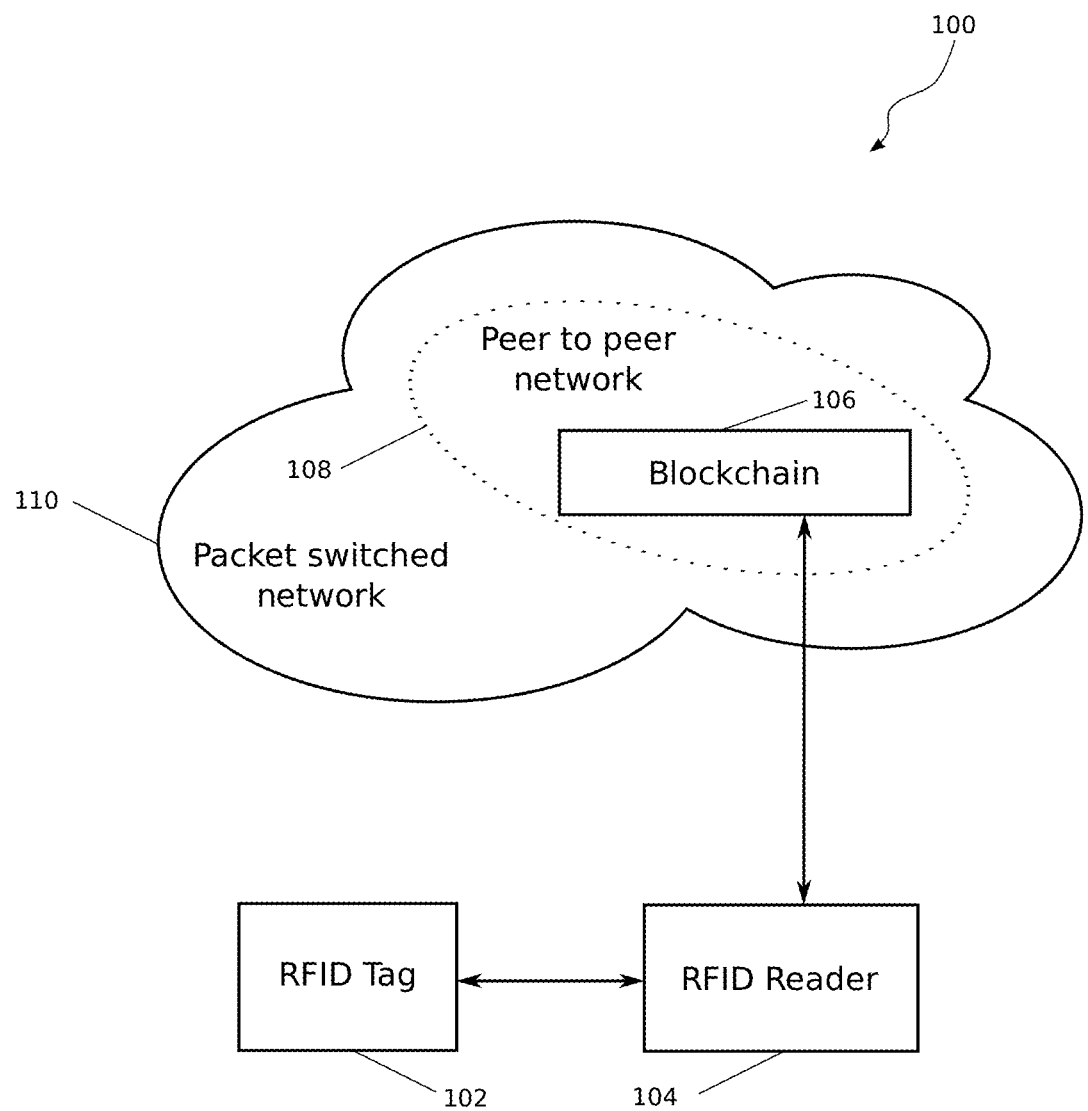
FIG. 1 illustrates a system for securely and reliably identifying an RFID tag comprising the RFID tag, an RFID reader, and a blockchain, in accordance with an embodiment of the present disclosure.

Aspects of this disclosure will be described in the context of an exemplary system 100 comprising an RFID tag 102, a network connected RFID reader 104 and a blockchain 106, as shown schematically in FIG. 1.

In the exemplary system the RFID tag 102 may communicate with the RFID reader 104. In some embodiments the RFID tag 102 may comprise a passive tag powered by scavenging power from radio waves produced by the RFID reader 104. In other embodiments the RFID tag may comprise a battery.

The RFID reader 104 may comprise a network connected device for communicating through a packet switched network 110 with one or more elements of a peer to peer network 108, through which the blockchain 106 may be instantiated.

Possible embodiments of elements of the exemplary system 100 are now examined in more detail.

Figure 2:
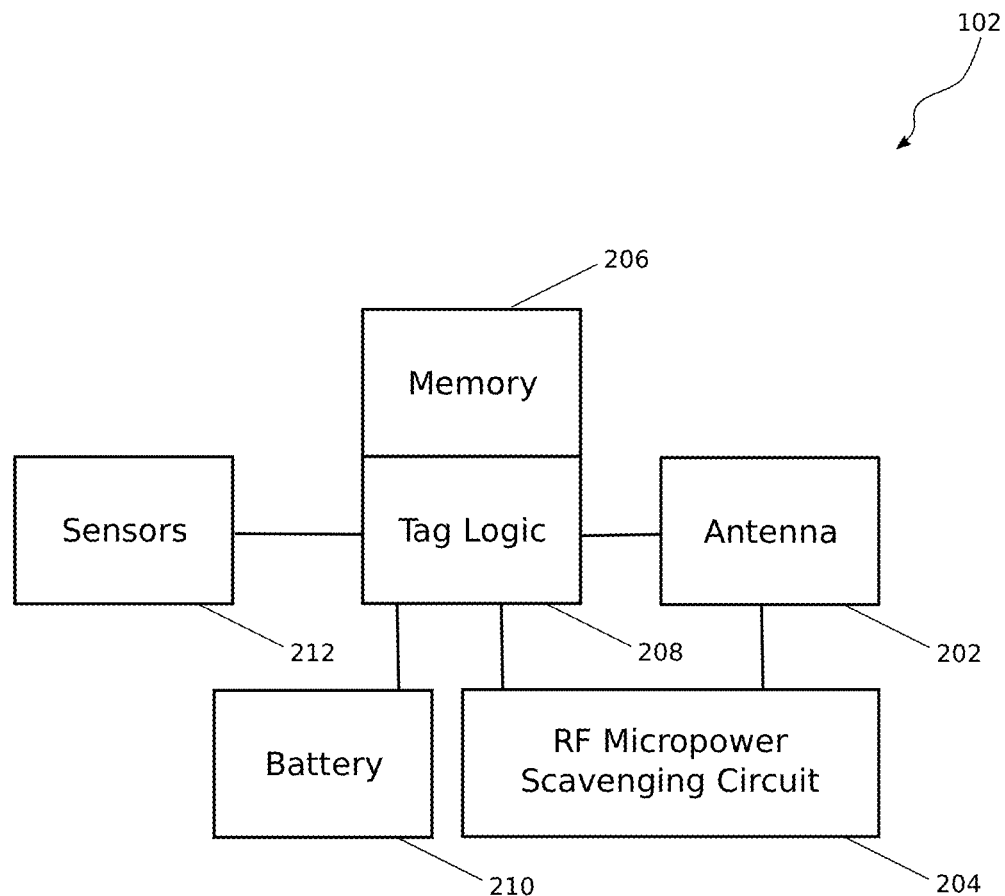
FIG. 2 is a diagram illustrating an RFID tag, in accordance with an embodiment of the present disclosure.

In FIG. 2 a possible embodiment of the RFID tag 102 is illustrated.

The RFID tag 102 may comprise an antenna 202, through which the RFID tag 102 may communicate with the RFID reader 104.

The RFID tag 102 may comprise an RF micropower scavenging circuit 204, whereby the RFID tag may extract power from radio transmissions transmitted by the RFID reader 104, in order to power the RFID tag 102.

In other embodiments the RFID tag 102 may comprise a battery 210, through which the RFID tag 102 may be powered.

In hybrid embodiments of the RFID tag 102 a battery 210 and an RF micropower scavenging circuit may both be present, whereby the RFID tag may reduce exhaustion of the battery 210 by utilising power from other sources such as the RFID reader radio transmissions, thus extending a lifespan of the battery 210.

The RFID tag 102 may comprise sensors 212, which may produce data extracted from an environment surrounding the RFID tag 102. The sensors may comprise one or more of: an altimeter, a magnetometer, a gyroscopic sensor, an accelerometer, a thermometer, a pressure gauge, a light sensor, a camera, a microphone, an odometer, an infrared sensor, an ultrasonic sensor, a gas sensor, a smoke sensor, an alcohol sensor, a proximity sensor, a humidity sensor, a moisture sensor, a tilt sensor, a force sensor, an electrical resistance meter, a voltage meter, an electrical current meter, a tamper sensor, and/or an other sensor type.

The RFID tag 102 may comprise a memory 206. The memory 206 may be implemented as non-volatile RAM, volatile battery-backed RAM, ROM, EEPROM, or other memory for storing and receiving data and/or computer code. Part or all of the memory may comprise a cryptographically secure data storage, which may be implemented either in hardware, software, or a combination of the two. The memory may be compartmentalized into memory sectors, and in some embodiments each memory sector may be accessed only by one or more access keys, either by encrypting data in each memory sector with an access key, or by the RFID tag only transmitting data from a given memory sector when presented with a correct access key.

The RFID tag 102 may comprise a tag logic 208. The tag logic may be implemented through an array of logic gates, a general purpose processor, a programmable logic controller (PLC), a digital signal processor (DSP), an application specific integrated circuit (ASIC), a field programmable gate array (FPGA) or other programmable logic device, discrete gate or transistor logic, discrete hardware components, or any combination thereof configured to implement methods detailed in the present disclosure.

In some embodiments the tag logic 208 may coordinate extracting data from radio signals received via the antenna 202 and responding to commands contained in the data, for example by: writing or overwriting data to the tag memory 206, retrieving further data from the memory and transmitting said further data back to the RFID reader 104, and transforming the further data before transmitting, provided certain conditions are met by the data.

Figure 3:
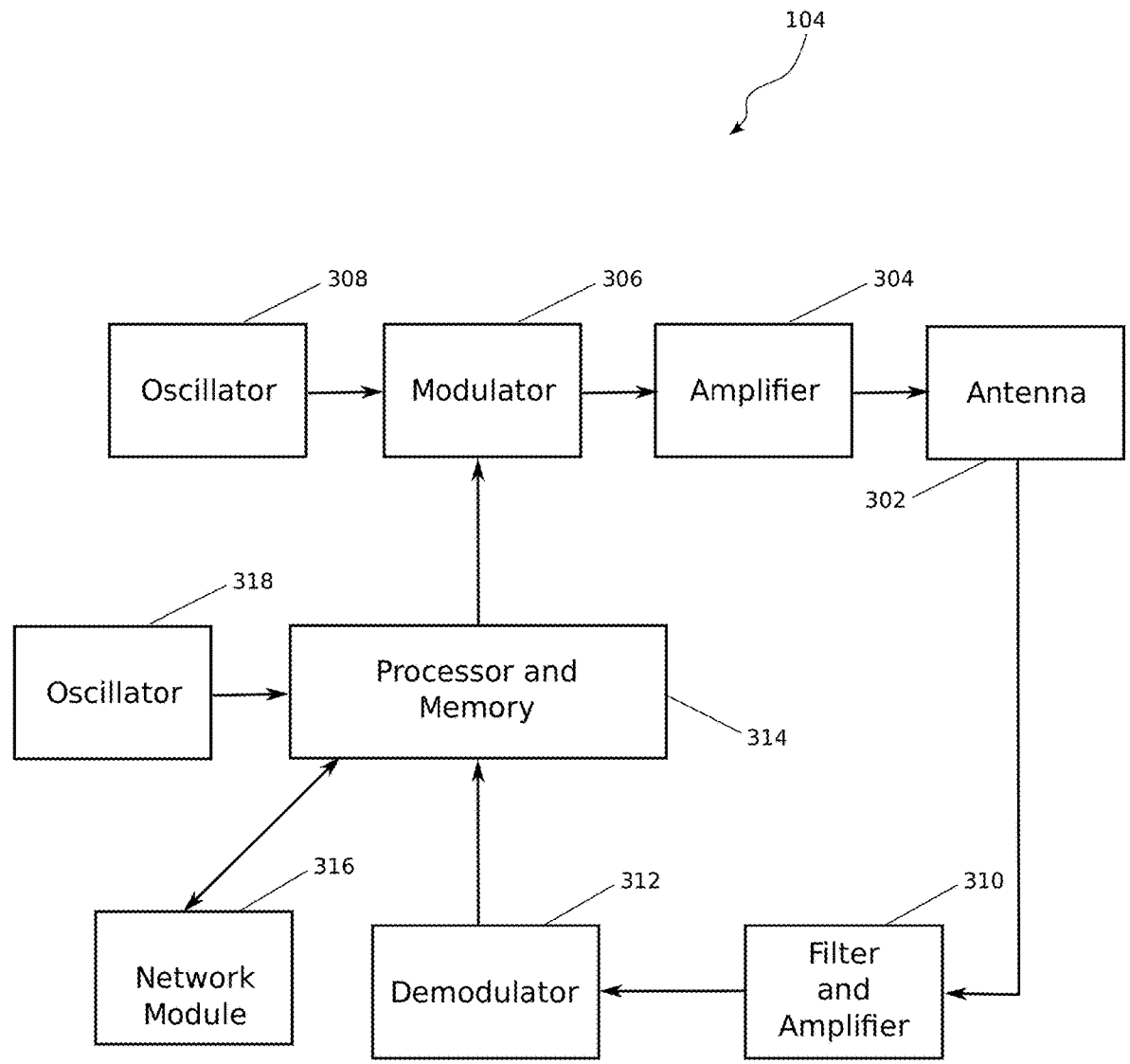
FIG. 3 is a diagram illustrating an RFID reader, in accordance with an embodiment of the present disclosure.

In FIG. 3 a possible embodiment of the RFID reader 104 is illustrated.

The RFID reader may comprise an antenna 302. In some embodiments the antenna 302 may transmit and/or receive radio signals. In other embodiments the antenna 302 may comprise a compound antenna with multiple components optimized for sending or receiving radio signals at one or more specified radio frequencies.

The RFID reader 104 may comprise an oscillator 308 generating a base frequency for radio transmissions.

An output from the oscillator 308 may be modulated using a modulator 306, said modulator 306 taking as an input the output from the oscillator 308 and a data signal from a processor and memory 314, and outputting a modulated data signal.

The RFID reader 104 may comprise an amplifier 304 that may take the modulated data signal as an input, and may amplify the modulated data signal before feeding it to the antenna 302 for transmission to the RFID tag 102.

The RFID reader 104 may comprise a processor and memory 314, which in some embodiments may comprise a computing device. The memory may comprise computer instructions, which when executed on the processor may cause the RFID reader 104 to co-ordinate the demodulator 312 in order to receive signals from the RFID tag 102, and to co-ordinate the modulator 306 in order to send signals to the RFID tag 102.

The RFID reader 104 may comprise a filter and amplifier 310 in order to enhance signals received by the antenna 302.

The RFID reader 104 may comprise an interface 318 for receiving commands from a user or for displaying feedback to the user.

The RFID reader 104 may comprise a network module 316 for communicating with other devices on a packet switched network. The RFID reader 104 may use the network module 316 to receive data from the blockchain and to write data to the blockchain. In some embodiments, the RFID reader 104 may communicate indirectly with a blockchain through an intermediate blockchain node.

Figure 4:
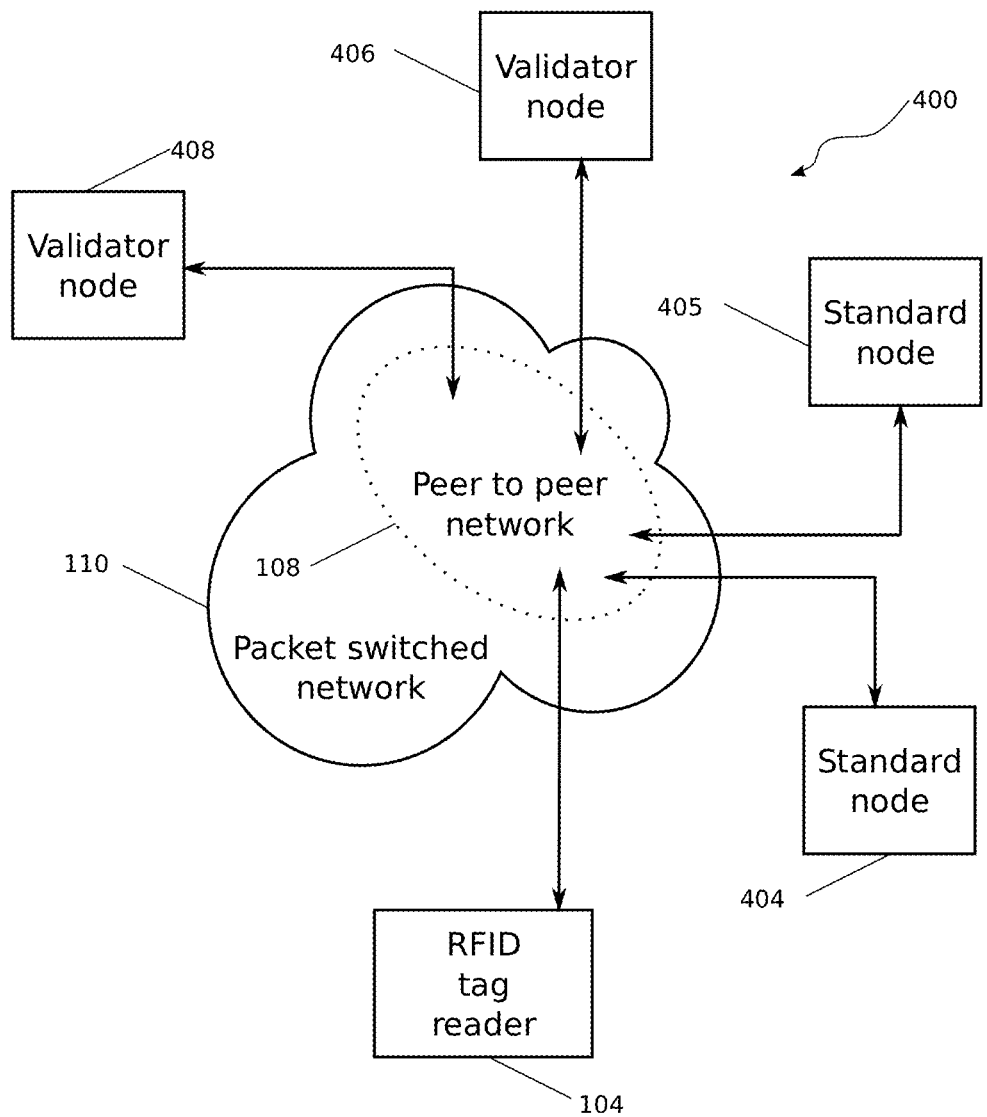
FIG. 4 is a diagram illustrating a possible embodiment of a blockchain.

In FIG. 4 an embodiment of a blockchain 400, instantiated by a plurality of network connected devices communicating through the medium of a peer-to-peer network 108 is presented. As depicted, the peer-to-peer network 108 is embodied within a packet switched network 110, through the interconnection of the plurality of network connected devices on the peer-to-peer network 108.

The RFID reader 104 may connect to the peer-to-peer network through a direct connection to the packet switched network with a wired connection, or through a wireless connection by association with a wireless access point, a cellular base station, a Bluetooth connection, or other means of connection.

Other devices connected to the peer-to-peer network may include network connected devices acting as a "standard node", for example a blockchain node 404, and a second blockchain node 405 whose role is to maintain a list of other devices connected through the peer-to-peer network, to forward on received network messages or blockchain transactions to those devices on the list, possibly independently, or possibly as a response to a request from another network connected device. Standard nodes may, in some embodiments, be queried for data present on the blockchain 400. As one skilled in the art will be aware, no individual standard node is required to have a complete list of all devices, as the process of peer-to-peer networking only requires that a union of a set of all standard nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the standard nodes on said network.

Further devices connected via the peer-to-peer network may include one or more network connected devices 406, 408 acting as an "enhanced node", whose role is to receive blockchain transaction messages from the peer-to-peer network; process them according to a consensus system of the blockchain 400; and transmit results of said processing back to the peer-to-peer network 108 for inclusion in the blockchain.

Figure 5:
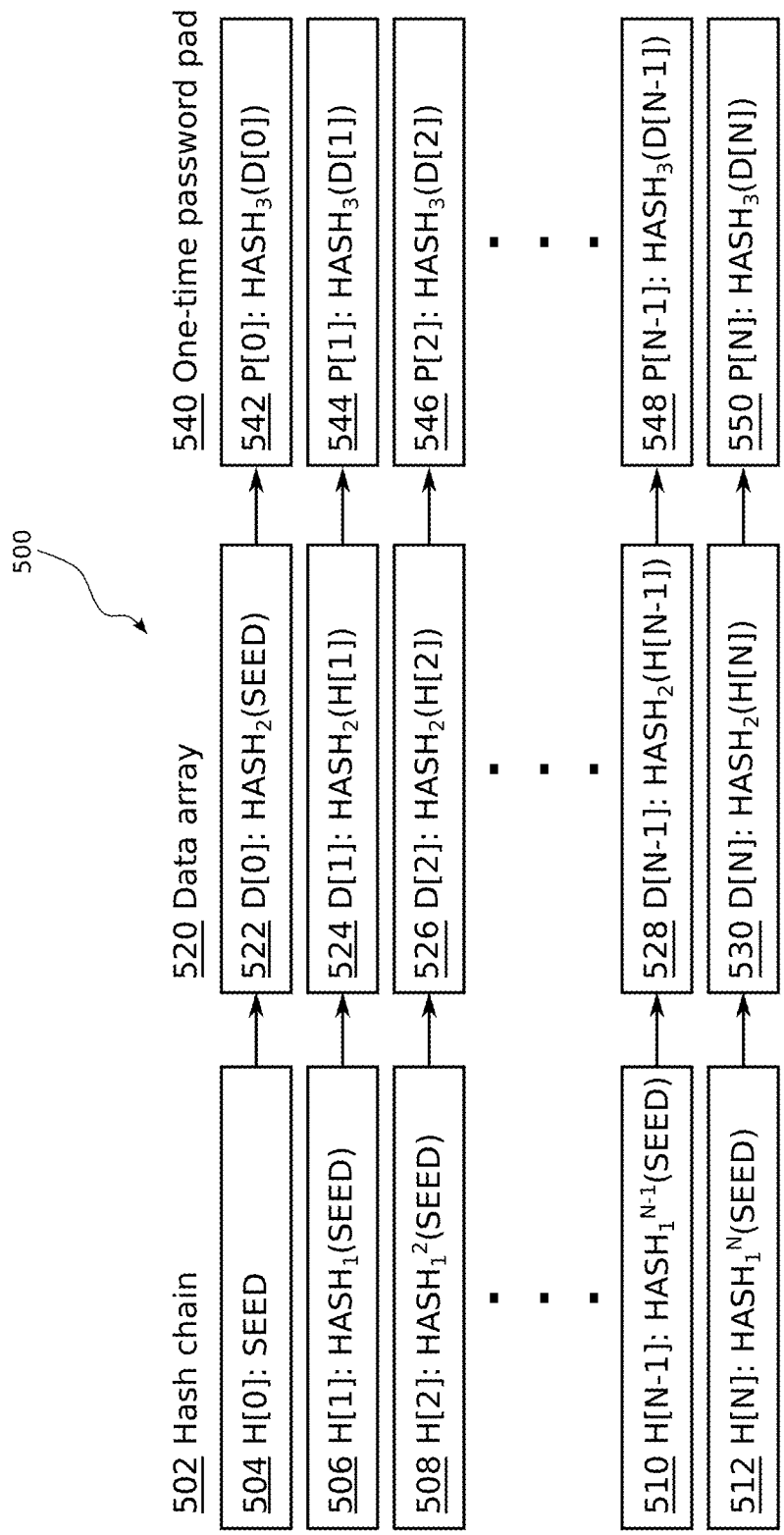
FIG. 5 is a diagram illustrating a possible method for constructing a one-time password pad, in accordance with an embodiment of the present disclosure.

In FIG. 5 a diagram illustrating a structure 500 and construction method for a one-time password pad and preimages is presented, in a possible embodiment of the present disclosure.

Construction may commence with a process for generating a hash chain 502, denoted as an array H[ ] in which the hash chain 502 is generated from a seed value and a repeated application of a hash function $HASH_1$.

A first value of the hash chain 502 is the seed value SEED stored in a first element of the array H[0] 504.

A second value of the hash chain 502 is generated by applying the hash function $HASH_1$ to the SEED, stored in a second element of the array H[1] 506.

A third value of the hash chain 502 is generated by applying a hash function $HASH_1$ to the hash of the SEED, that is $HASH_1^2(SEED)$ or equivalently $HASH_1(H[1])$, stored in a third element of the array H[2] 508.

Those skilled in the art will appreciated that the process may repeated iteratively until a hash chain of a required length is generated. For example if N+1 elements are required for the hash chain, a final operation of the process may consist of applying a hash function $HASH_1$ to a penultimate element of H[ ], namely H[N−1] 510, to produce $HASH_1^N(SEED)$, or equivalently $HASH_1(H[N-1])$, stored in H[N] 512.

A data array D[ ] 520 may now be constructed from the hash chain 502 using a different hash function, denoted by $HASH_2$. Those skilled in the art will appreciate that $HASH_2$ should be different to $HASH_2$, because if the same hash function is used, the data array D[ ] 520 will be H[ ] 502 offset by one element.

In some embodiments, a list of preimages may comprise the data array D[ ] 520. The data array D[ ] 520 may be used in preference to the hash chain 502, as compromising an element of the hash chain 502 compromises all subsequent elements, whereas compromising an element from D[ ] 520 does not compromise any other elements.

As an example, a first element of the data array D[0] 522 may be constructed by applying $HASH_2$ to the first element of the hash chain H[0] 504. D[0] is therefore equal to $HASH_2(SEED)$.

Similarly, a second element of the data array D[1] 524 may be constructed by applying $HASH_2$ to the second element of the hash chain H[1] 506. D[1] is therefore equal to $HASH_2(H[1])$. Likewise a third element of the data array D[2] 526 may be constructed by applying $HASH_2$ to the third element of the hash chain H[2] 506. D[2] 526 is therefore equal to $HASH_2(H[2])$.

Those skilled in the art will appreciate that the above process may be repeated iteratively until the data array D[ ] 520 of a required length is generated. For example if N+1 elements are required for the data array D[ ] 520, a penultimate operation of the process may consist of applying the hash function $HASH_2$ to a penultimate element of H[ ] 502, namely H[N−1] 510, to produce $HASH_2(H[N-1])$, denoted as D[N−1] 528, and a final operation of the process may consist of applying the hash function $HASH_2$ to a last element of H[ ] 502, namely H[N] 512, to produce $HASH_2(H[N])$, denoted as D[N] 530.

A one-time password pad 540 may now be derived from the data array 520 using a third hash function $HASH_3$.

For example, a first element P[0] 542 of the one-time password pad 540 may be generated by applying $HASH_3$ to the first element D[0] 522 of the data array.

Similarly, a second element of the one-time password pad P[1] 544 may be constructed by applying $HASH_3$ to the second element of the data array D[1] 524. P[1] 542 is therefore equal to $HASH_3(D[1])$. Likewise a third element of the one-time password pad D[3] 546 may be constructed by applying $HASH_3$ to the third element of the data array D[2] 526. P[2] 544 is therefore equal to $HASH_3(D[2])$.

Those skilled in the art will appreciate that the above process may be repeated iteratively until the one-time password pad P[ ] 540 of a required length is generated. For example if N+1 elements are required for the one-time password pad P[ ] 540, a penultimate operation of the process may consist of applying the hash function $HASH_3$ to a penultimate element of D[ ] 520, namely D[N−1] 528, to produce $HASH_3(D[N-1])$, denoted as P[N−1] 548, and a final operation of the process may consist of applying the hash function $HASH_3$ to a last element of D[ ] 520, namely D[N] 530, to produce $HASH_3(D[N])$, denoted as P[N] 550.

In other embodiments a preimage list and derived access key list may be constructed through other processes, for example through a generation of a random list of preimages using a secure random number generator.

Figure 6:
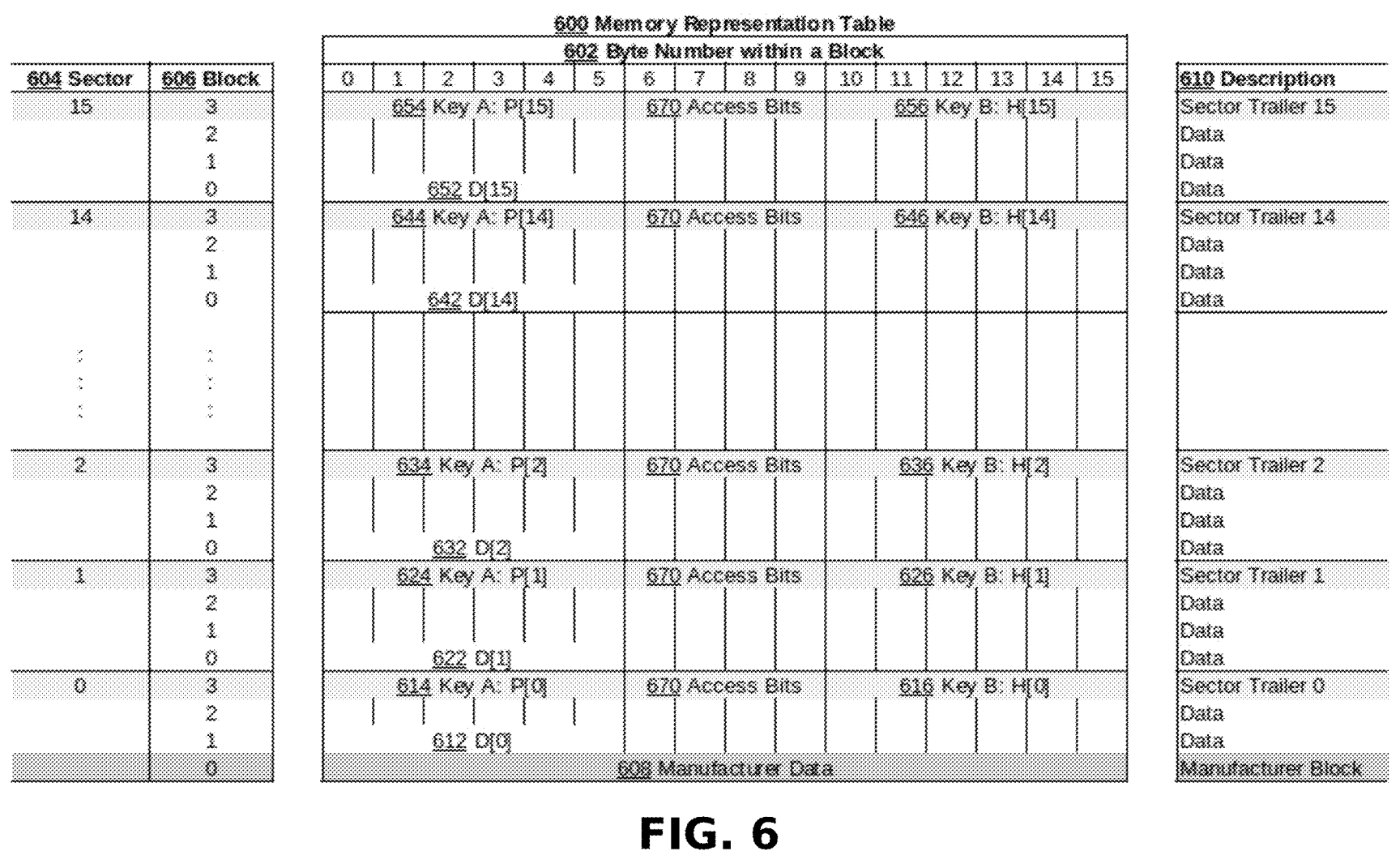

In FIG. 6 a practical embodiment of the one-time password pad 540 and the data array 520 installed in a MIFARE Classic® 1k RFID tag memory is presented. Those skilled in the art will appreciate that a similar embodiment for a MIFARE Plus® RFID tag and a MIFARE DESFire® RFID tag is equally possible, due to similarities in memory structure and access, and similarly that other RFID tags may have the one-time password pad 540 and the data array 520 installed on them in an equivalent manner.

In the present embodiment, a memory representation table 600 is presented. Columns within the memory representation table 600 represent a byte number within a block 602.

Each portion of memory is divided into a Sector 604, and each sector is divided into blocks 606. A column presenting a description 610 is provided for illustrative purposes.

Throughout memory of the RFID tag, access bits 670 may be set to an access value of 78 77 88 XX, where XX may be any value. Within the MIFARE Classic® implementation these access bits 670 when set to the access value ensure that each of a plurality of Key A values provide read only access to a corresponding sector, and each of a plurality of Key B values provide read and write access to the corresponding sector. Other embodiments may use different access values to provide equivalent access rights.

A first block of a first sector contains manufacturer data 608, which may comprise the identifier.

A first data array entry D[0] 612 may be stored in a first six of bytes of block 0 of sector 0. A first key A with value P[0] 614 may be stored in a first six bytes of block 3 of sector 0, with the first key A providing access to read data within sector 0. A first key B with value H[0] 616 may be stored in a last six bytes of block 3 of sector 0, with the first key B providing both read and write access within sector 0. The first data array entry D[0] may comprise a preimage of the first key A with value P[0].

A second data array entry D[1] 622 may be stored in a first six of bytes of block 0 of sector 1. A second key A with value P[1] 624 may be stored in a first six bytes of block 3 of sector 1, with the second key A providing access to read data within sector 1. A second key B with value H[1] 626 may be stored in a last six bytes of block 3 of sector 1, with the second key B providing both read and write access within sector 1. The second data array entry D[1] may comprise a preimage of the second key A with value P[1].

A third data array entry D[2] 632 may be stored in a first six of bytes of block 0 of sector 2. A third key A with value P[2] 634 may be stored in a first six bytes of block 3 of sector 2, with the third key A providing access to read data within sector 2. A third key B with value H[2] 636 may be stored in a last six bytes of block 3 of sector 2, with the third key B providing both read and write access within sector 2. The third data array entry D[2] may comprise a preimage of the third key A with value P[2].

A penultimate data array entry D[14] 642 may be stored in a first six of bytes of block 0 of sector 14. A penultimate key A with value P[14] 644 may be stored in a first six bytes of block 3 of sector 14, with the penultimate key A providing access to read data within sector 14. A penultimate key B with value H[14] 646 may be stored in a last six bytes of block 3 of sector 14, with the penultimate key B providing both read and write access within sector 14. The penultimate data array entry D[14] may comprise a preimage of the penultimate key A with value P[14].

Finally, a last data array entry D[15] 652 may be stored in a first six of bytes of block 0 of sector 15. A last key A with value P[15] 654 may be stored in a first six bytes of block 3 of sector 15, with the last key A providing access to read data within sector 15. A last key B with value H[15] 656 may be stored in a last six bytes of block 3 of sector 15, with the last key B providing both read and write access within sector 15. The last data array entry D[15] may comprise a preimage of the last key A with value P[15].

Those skilled in the art will appreciate that preimages may be stored in different byte sequences within each sector and may be of different lengths to those described above. Similarly, a structure of preimage and key storage described above may be mapped onto different RFID tag memory layouts.

In some embodiments each memory sector may also comprise a salt that is concatenated with the preimge before hashing the salt and the preimage to generate the access key.

Figure 7:
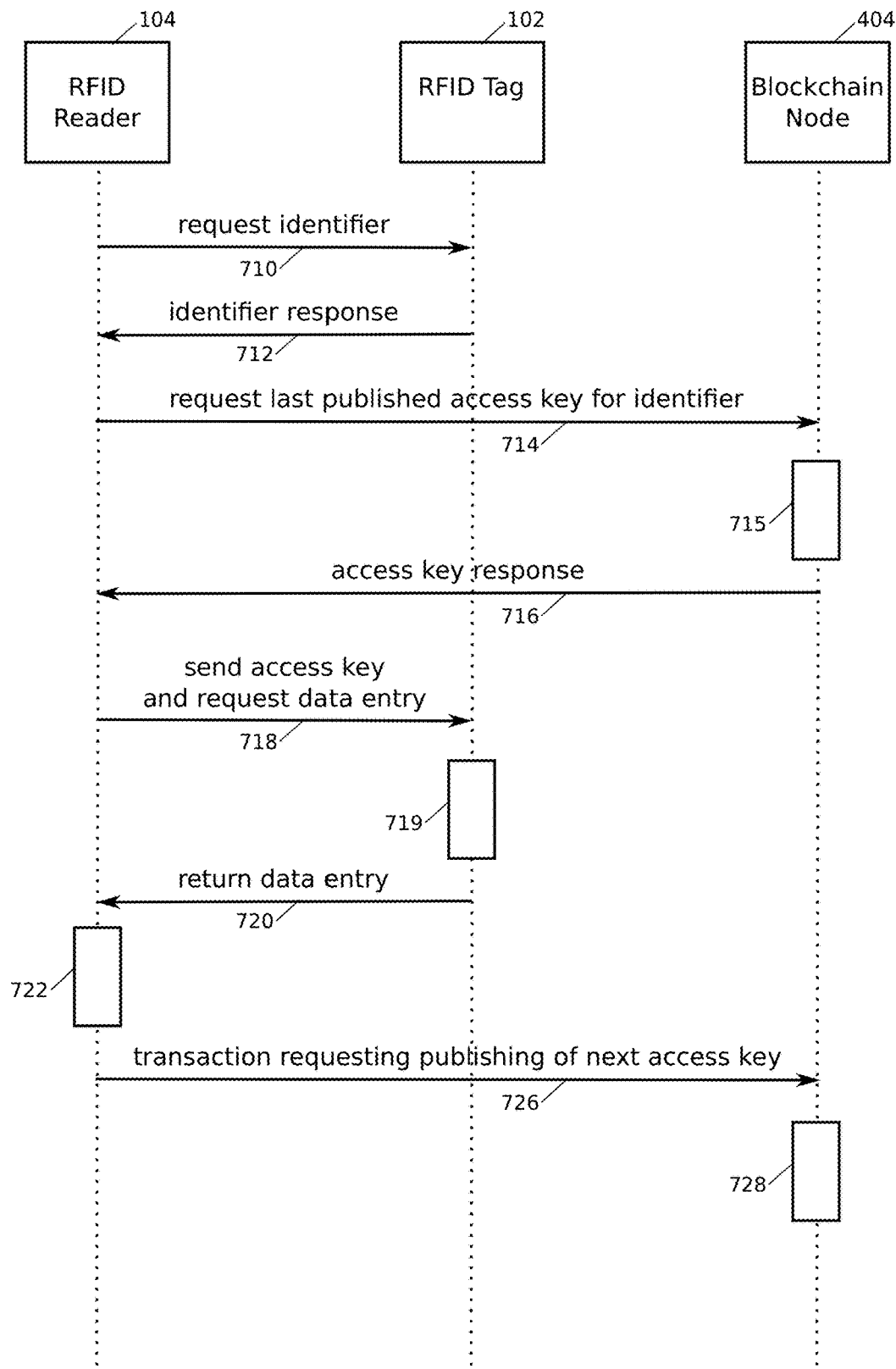
FIG. 7 is a signal diagram illustrating a method for verifying an identity of an RFID tag using a blockchain, in accordance with an embodiment of the present disclosure.

FIG. 7 presents a signal diagram illustrating an exchange between the RFID reader 104, the RFID tag 102 and the blockchain node 404 in an example of an embodiment of the present disclosure.

In some embodiments, operations may start by the RFID reader 104 powering up, connecting to, and requesting the identifier from the RFID tag 102, as shown in communication 710.

The RFID tag 102 may subsequently respond with the identifier, as shown in communication 712.

The RFID reader 104 may then pass a request for a last published access key associated with the identifier to the blockchain node 404, as shown in communication 714.

In other embodiments, the RFID reader 104 may maintain a copy of the blockchain in memory, for example in a database, and may query the database directly for the last published access key.

The blockchain node 404 may search a copy of all transactions published on the blockchain, said copy stored in memory or other storage, and may retrieve a last transaction in which the last published access key linked with the identifier is stored, as shown in operation 715.

The blockchain node 404 may then return an access key response, comprising the last published access key for the identifier, to the RFID reader 104, as shown in communication 716.

Operations may then proceed by the RFID reader 104 sending a request, comprising the last published access key, for a data entry stored in the RFID tag 102, as shown by communication 718.

The RFID tag 102 may then perform a verification that the last published access key provides read access to a memory sector, as shown by operation 719. If the verification is successful, the RFID tag 102 may retrieve the data entry from the memory sector and may return the data entry to the RFID reader, as shown in communication 720.

The RFID reader 102 may then perform a verification on the data entry by confirming that by applying a hash function to the data entry the last published access key is derived, as shown in operation 722.

If the verification is successful, the RFID tag 102 is considered authenticated. In this case, the RFID reader 104 may submit a transaction to the blockchain node 404, for publishing on the blockchain, as shown in communication 726. The transaction may comprise one or more of: the data entry, the last published access key, and a request for a new access key to be published.

In some embodiments, if the verification is not successful, the RFID reader 104 may submit a transaction to the blockchain node 404 for publishing on the blockchain, the transaction reporting that an authentication with the RFID tag 102 failed.

The blockchain node 404 may subsequently publish the transaction on the blockchain, as shown in operation 728.

In some embodiments, the blockchain node 404 may subsequently publish the new access key on the blockchain. In other embodiments the blockchain node 404 may publish one or more of: the new access key, the data entry, the last published access key, and the identifier on the blockchain.

In other embodiments, a role of the blockchain node 404 may be undertaken by a smart contract running on the blockchain.

In FIG. 8 an exemplary embodiment of a smart contract 800 for maintaining a publication of access keys is presented.

In other embodiments, maintaining the publication of access keys may be managed by a blockchain node comprising computer code that, when executed, causes the blockchain node to monitor data on the blockchain and to publish a new access key when a transaction arrived on the blockchain that indicates a prior access key has been used, for example, by the RFID reader 104 (not shown) presented in previous figures.

In the exemplary embodiment of the smart contract 800, the smart contract 800 may comprise data and computer code that is stored on the blockchain, and is executed by one or more blockchain nodes when conditions described by the smart contract 800 are met.

Blockchain client devices, such as but not limited to the RFID reader 104, or a proxy for the RFID reader such as a blockchain node, may submit data to the blockchain referencing the smart contract 800, which may result in nodes responsible for maintaining the blockchain performing calculations on the data and writing further transactions to the blockchain.

The exemplary embodiment of the smart contract 800 may comprise a procedure 802 for returning a current access key for an RFID tag identified by an identifier supplied to the smart contract 800.

The exemplary embodiment of the smart contract 800 may comprise a procedure 804 for publishing a new access key for an RFID tag identified by an identifier supplied to the smart contract 800 in response to receiving the identifier, and one or more of: the current access key and a preimage of the current access key.

The exemplary embodiment of the smart contract 800 may comprise a procedure 806 for verifying a validity of an access key based on a data entry supplied to the smart contract 800. The procedure 806 may return a decision of valid or invalid in an encrypted transaction to a blockchain address specified in a query comprising the blockchain address, the access key and the data entry, in which the data entry may comprise a preimage of the access key.

The exemplary embodiment of the smart contract 800 may comprise a procedure 808 that, when queried, may return a total number of access keys published on the blockchain for the identifier.

The exemplary embodiment of the smart contract 800 may comprise a procedure 810 that, when invoked, may revoke a tag based on the identifier. In some embodiments the procedure 810 may be configured to execute only when provided with a master key stored in the smart contract 800 by a manufacturer when the smart contract was initially deployed. In other embodiments the procedure 810 may be configured to execute when provided with conflicting duplicate reports of a use of the access key.

The exemplary embodiment of the smart contract 800 may comprise a procedure 814 for accepting a token payment from another party. In some embodiments, on procedure 814 accepting a token payment, one or more other procedures of the smart contract 800 may subsequently be executed.

The exemplary embodiment of the smart contract 800 may comprise a procedure 816 for offering a token payment from cryptocurrency reserves controlled by the smart contract 800. In other embodiments, the token payment may be fulfilled with a token instantiated by the smart contract 800, for example an Ethereum Request for Comment 20 (ERC-20) compliant token.

The exemplary embodiment of the smart contract 800 may comprise a procedure 818 for publishing the new access key in encrypted form. In some embodiments, the procedure 818 may select the new access key, encrypt the new access key with a public key provided to the smart contract 800 through a blockchain transaction, and may then publish the new access key encrypted with the public key on the blockchain. In other embodiments the procedure 818 may generate a symmetric encryption key, encrypt the new access key with the symmetric key, and then publish the new access key in encrypted form on the blockchain.

The exemplary embodiment of the smart contract 800 may comprise a procedure 820 for sending an encryption key for decrypting the new access key in encrypted form. In some embodiments, the encryption key may comprise the symmetric encryption key, and the procedure 820 may retrieve a public key from a blockchain transaction, encrypt the symmetric encryption key with the public key, and may then publish the symmetric encryption key encrypted with the public key on the blockchain.

The exemplary embodiment of the smart contract 800 may comprise a data block 822 comprising an array of valid access keys for the RFID tag. In some embodiments, the smart contract 800 may refer to the data block 822 in order to select a next access key to publish on the blockchain.

The exemplary embodiment of the smart contract 800 may comprise a data block 824 comprising a seed for generating the list of preimages and the list of access keys for the RFID tag. A method for generating the list of preimages and the list of access keys is disclosed above and in FIG. 5.

The exemplary embodiment of the smart contract 800 may comprise a data block 826 comprising a list of access keys for the RFID tag reported as used on the blockchain. The data block 826 may be used by the smart contract 800 to determine which access key to publish next.

Figure 9:
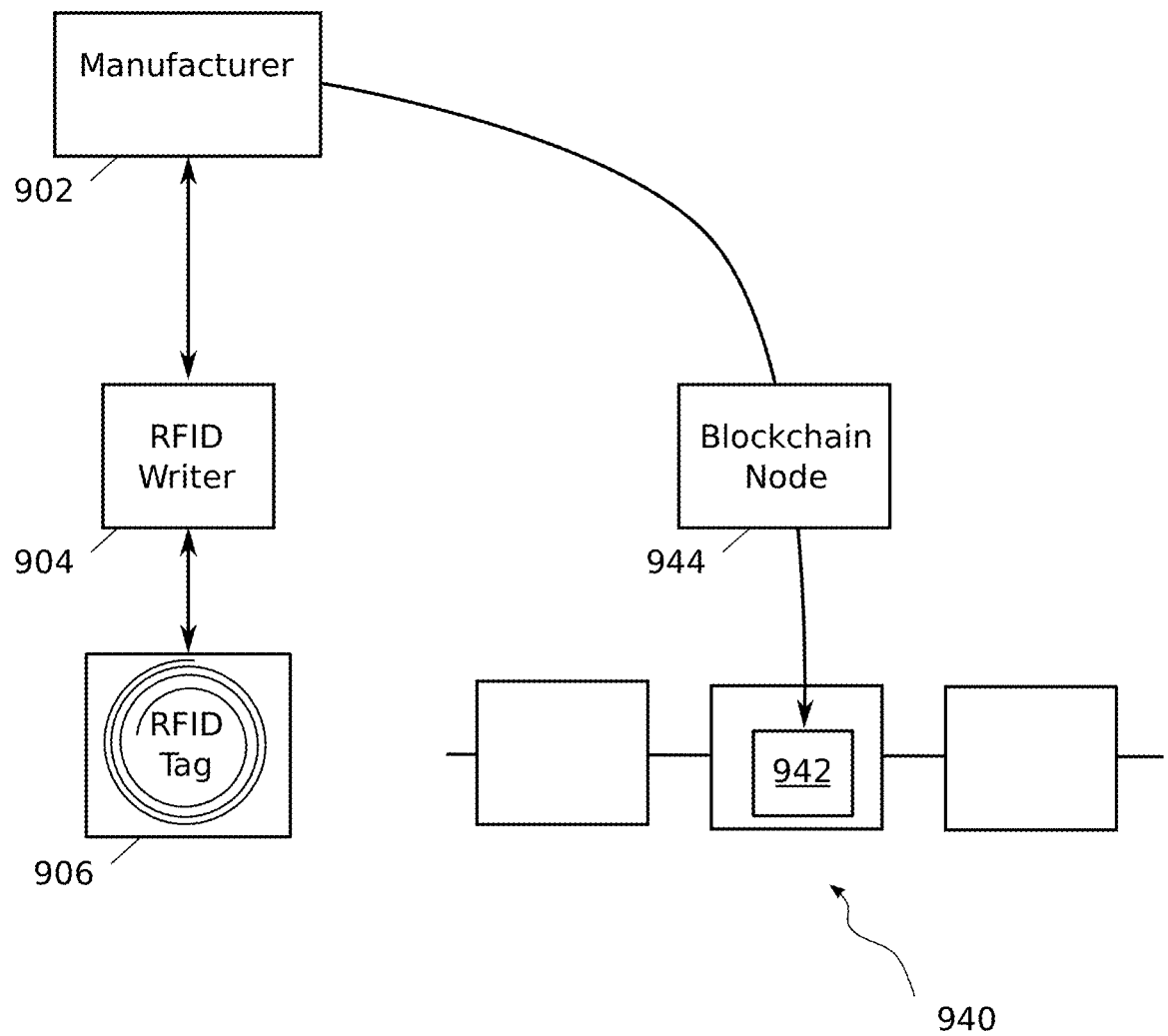
FIG. 9 is a block diagram illustrating an initial process allowing a manufacturer to generate a one-time password pad and load it onto an RFID tag and a blockchain, in accordance with an embodiment of the present disclosure.

In FIG. 9 a possible initial process for a manufacturer to generating a one-time password pad and loading it onto an RFID tag and a blockchain, in accordance with an embodiment of the present disclosure, is presented.

In the initial process, a manufacturer 902 may produce an item, and may wish to label it with an RFID tag in order to track the item on a blockchain.

The manufacturer 902 may generate a data array of preimages and a one-time pad of hashes of the data array of preimages, as disclosed above in the description of FIG. 5.

The manufacturer 902 may provide the data array of preimages and the one-time pad of hashes to an RFID writer 904.

The RFID writer 904 may then set an access key for each of one or more memory sectors of an RFID tag 906 equal to an entry of the one-time pad of hashes, and may load a corresponding preimage from the data array into a memory block of a corresponding memory sector.

The RFID writer 904 may retrieve an identifier from the RFID tag 906, and may return the identifier to the manufacturer 902.

The manufacturer 902 may then construct a blockchain transaction comprising the identifier of the RFID tag 906 and a first access key of the one-time password pad, and may submit the transaction to a blockchain node 944 for inclusion on a blockchain 940.

The blockchain node 944 may then publish the transaction onto the blockchain 940 on behalf of the manufacturer. The transaction as published on the blockchain is represented by 942. In other embodiments, the manufacturer 902 may comprise the blockchain node 944.

In other embodiments, the manufacturer 902 may construct and deploy a smart contract comprising the data array of preimages and the one-time password pad, and may submit the smart contract to the blockchain node 944 for deployment on the blockchain 940.

Figure 10:
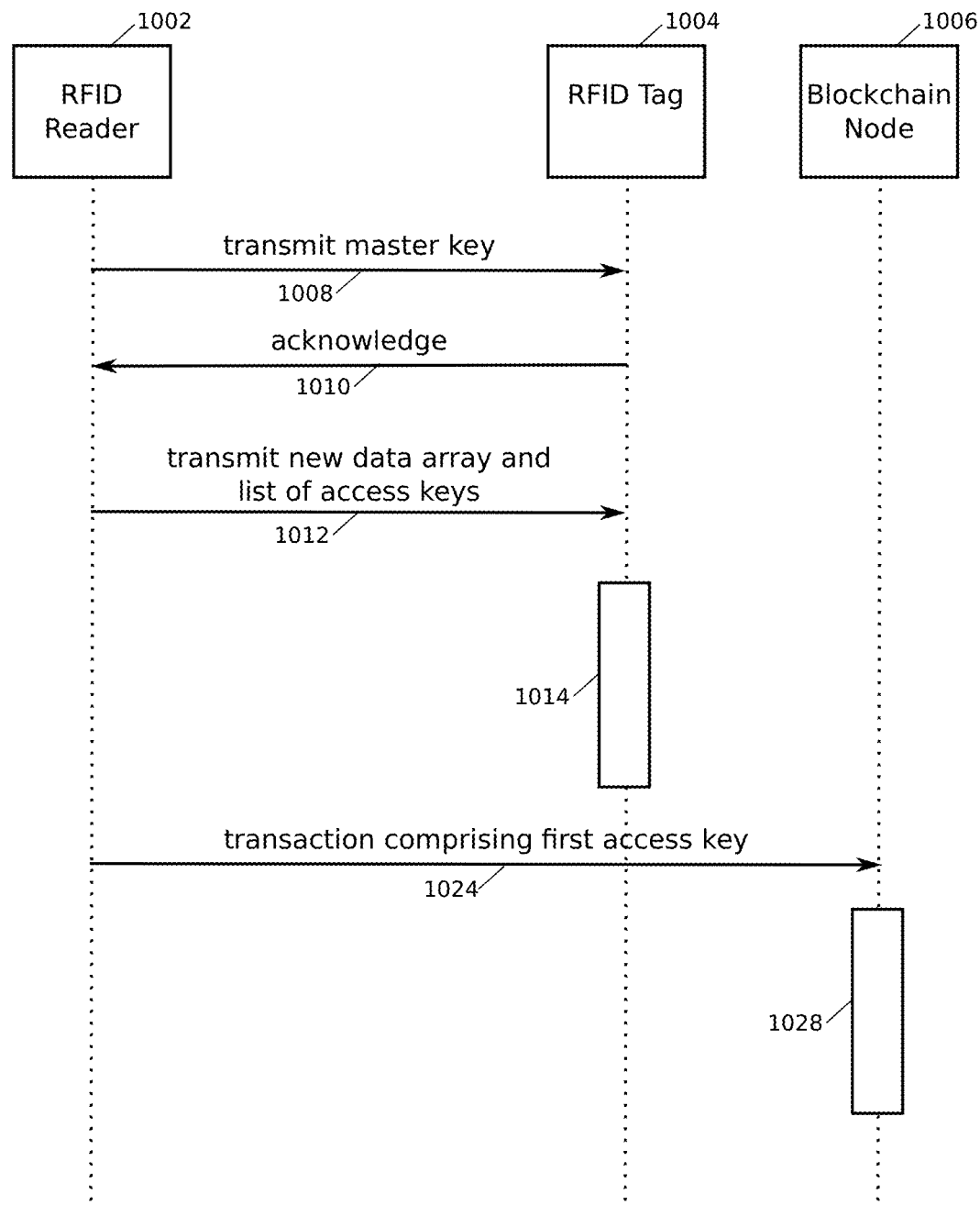
FIG. 10 is a signal diagram illustrating a method for replacing a one-time password pad on an RFID tag, in accordance with an embodiment of the present disclosure.

In FIG. 10 a signal diagram illustrating a method for replacing a one-time password pad on an RFID tag 1004 is presented, in accordance with an embodiment of the present disclosure.

In some embodiments, the method may also be used for a first time installing of a one-time password pad on the RFID tag 1004.

In the embodiment, an RFID reader 1002 may transmit a master key to the RFID tag 1004, as shown in transmission 1008. In other embodiments a Diffie-Helman key exchange or other secure mutual authentication may be used to ensure the master key is kept secret during transmission 1008.

In the embodiment, the RFID tag 1004 may acknowledge receipt of the master key, as shown by transmission 1010.

In the embodiment, secure communication between the RFID reader and the RFID tag may be established through transmission 1008 and transmission 1010.

The RFID reader 1002 may then transmit a data array and a list of access keys to the RFID tag, as shown in transmission 1012.

In some embodiments, each key in the list of access keys may be derived from a corresponding entry in the data array, for example by an application of a cryptographic hash function to a corresponding entry.

In the embodiment, the RFID tag 1004 may subsequently load each entry in the data array into a separate memory sector, and may lock the separate memory sector with a corresponding access key derived from each entry, such that each entry may only be retrieved from the separate memory sector by using the corresponding access key, as shown in operation 1014.

In some embodiments the RFID tag 1004 may subsequently acknowledge successful completion of operation 1014 to the RFID reader 1002.

In the embodiment, the RFID reader 1002 may then send a transaction comprising a first access key, and in some embodiments an identifier for the RFID tag 1004, to a blockchain node 1006 for publishing on a blockchain, as shown in transmission 1024.

In the embodiment, the blockchain node 1006 may then publish the transaction on the blockchain, as shown by operation 1028.

In some embodiments one or more of transmissions 1008, 1010, 1012 and 1024 may be conducted over a secure communication channel, for example through a secure socket layer (SSL) connection or a transport layer security (TLS) connection.

Figure 11:
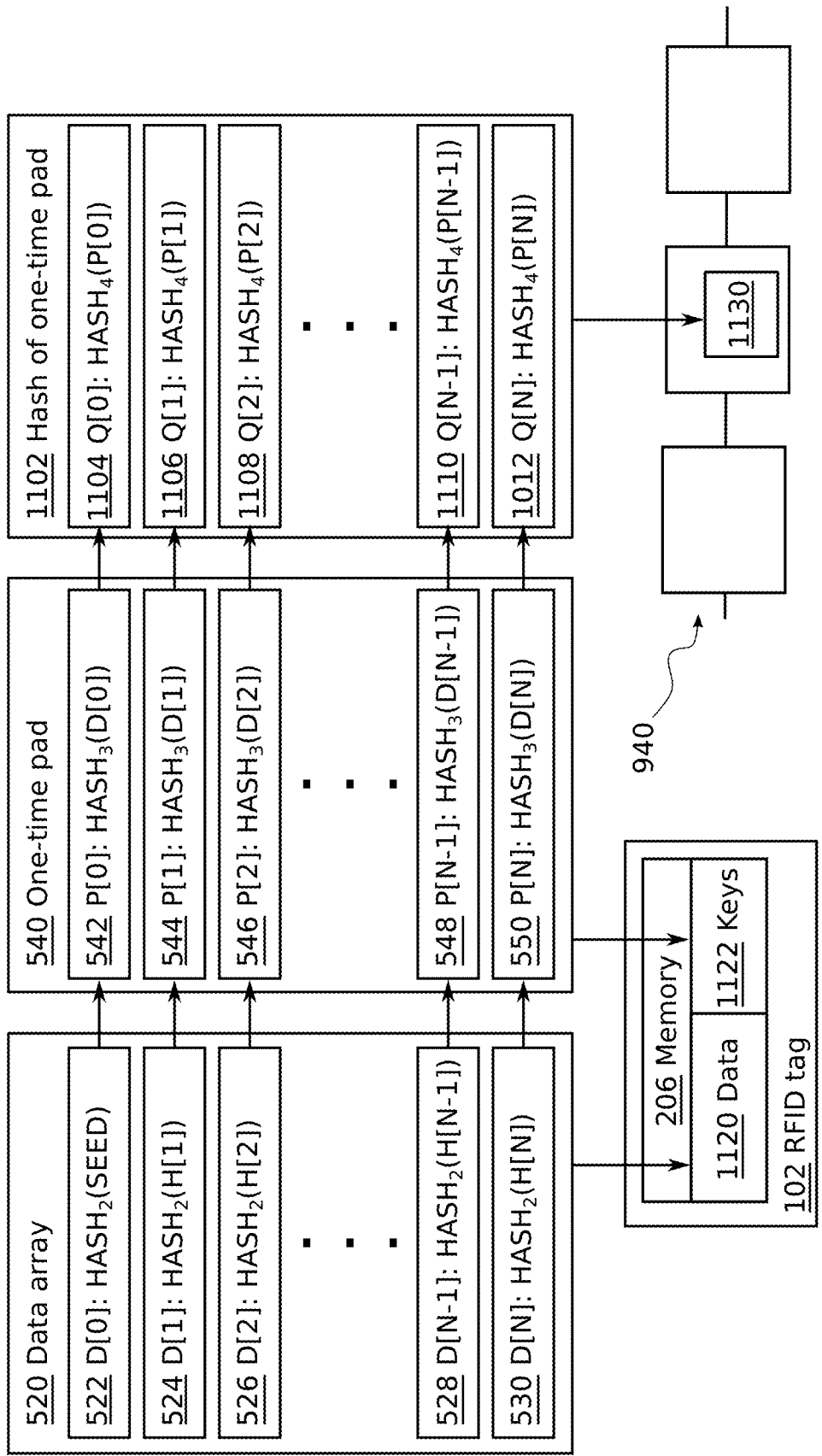
FIG. 11 is a diagram illustrating a use of an array of hashes derived from a one-time password pad, in an embodiment of the present disclosure.

In FIG. 11 a diagram illustrating a construction and use of an array of hashes derived from a one-time password pad, in an embodiment of the present disclosure, is presented. The diagram is an enhancement of FIG. 5.

In the embodiment, a data array Q[ ] 1102 comprising data entries is constructed, wherein each data entry is derived from an entry in the one-time password pad 540 described in FIG. 5. In some embodiments each data entry may be derived using a hash function $HASH_4$.

For example, entry Q[0] 1104 may be derived by applying $HASH_4$ to one-time password pad entry P[0] 542, entry Q[1] 1106 may be derived by applying $HASH_4$ to one-time password pad entry P[1] 544, entry Q[2] 1108 may be derived by applying $HASH_4$ to one-time password pad entry P[2] 546, and so on.

Finally, a penultimate entry Q[N−1] 1110 may be derived by applying $HASH_4$ to one-time password pad entry P[N−1] 548, and a last entry Q[N] 1112 may be derived by applying $HASH_4$ to one-time password pad entry P[N] 550.

In some embodiments $HASH_3$ and $HASH_4$ may be the same hash function.

Each entry from the data array D[ ] 520 may be loaded into a separate data section 1120 of the memory 206 of the RFID tag 102. Each entry from the one-time password pad P[ ] 540 may be installed in a keys section 1122 of the memory corresponding to the separate data section 1120.

The data array Q[ ] 1102 may be published in a block 1130 on the blockchain 940. Through this, when a key from the one-time password pad P[ ] 540 is published on the blockchain 940, it can be verified that the key is a genuine key from the one-time password pad 540 by applying the hash function $HASH_4$ to the key to produce a hash output, and checking that the data array Q[ ] 1102 contains a data entry equal to the hash output.

Figure 12:
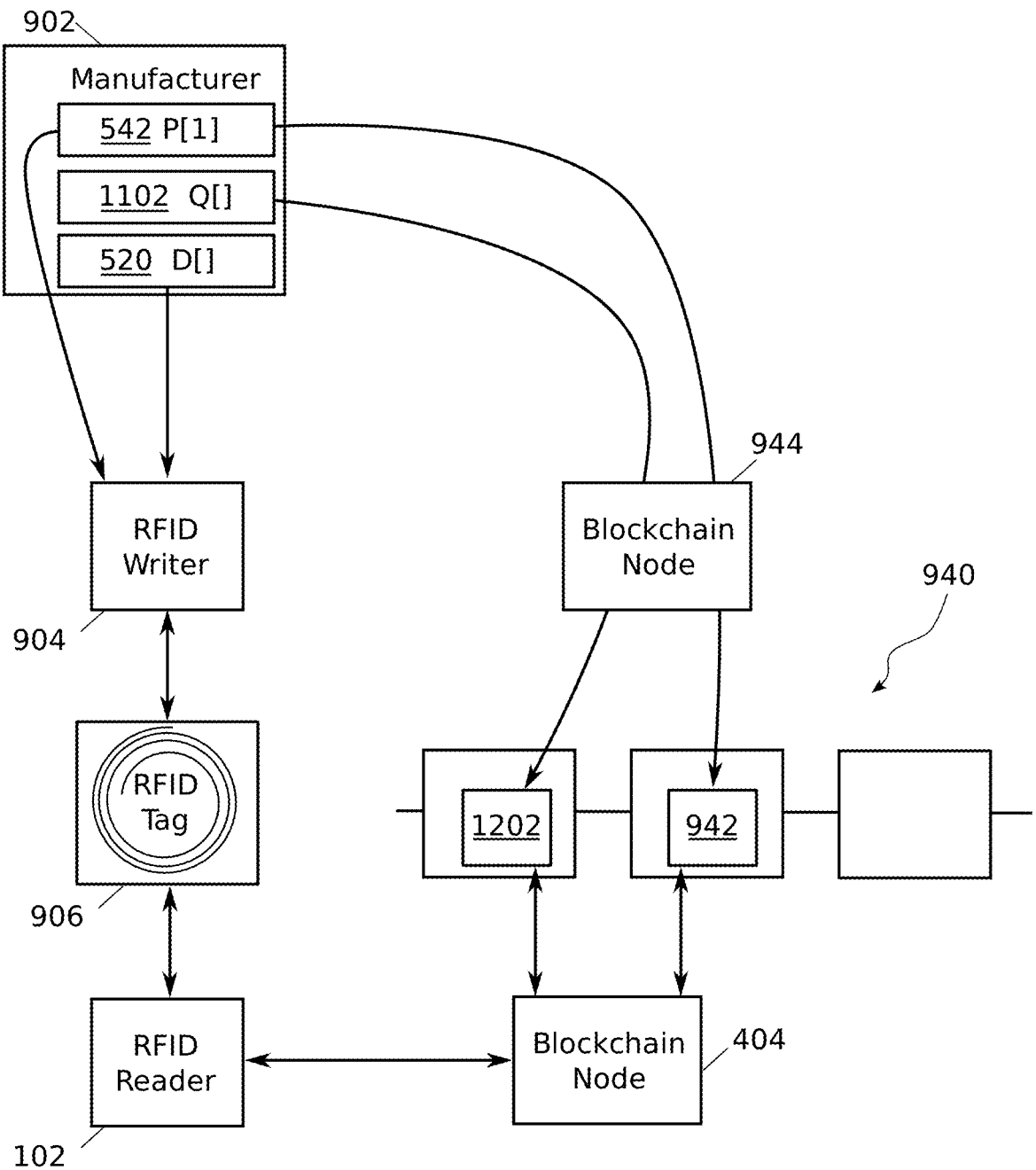
FIG. 12 is a block diagram illustrating a method for proving an authenticity of a one-time password pad using an array of hashes derived from the one-time password pad, in accordance with an embodiment of the present disclosure.

In FIG. 12 a block diagram illustrating a method for proving an authenticity of a one-time password pad using an array of hashes derived from the one-time password pad is presented, in accordance with an embodiment of the present disclosure. The block diagram is an enhancement of FIG. 9 and shows how the data array Q[ ] 1102 disclosed in FIG. 11 may be used.

In the embodiment, the manufacturer 902 may generate the data array D[ ] 520, and may derive the one-time password pad P[ ] 540 and the data array Q[ ] 1102.

As in FIG. 9, the manufacturer 902 may then pass the data array D[ ] 520 and the one-time password pad P[ ] 540 to the RFID writer 904 for loading onto the RFID tag 906, as previously disclosed.

The manufacturer 902 may then pass the data array Q[ ] 1102 in a transaction to the blockchain node 944, for publishing on the blockchain 940. The transaction is shown published on the blockchain 940 by 1202.

The manufacturer 902 may also pass the first element P[1] 542 of the one-time password pad P[ ] 540 in a second transaction to the blockchain node 944 for publishing on the blockchain 940. The second transaction is shown published on the blockchain by 942.

With assistance from the blockchain node 404 the RFID reader 102 may now perform a one-way authentication of the RFID tag 906 as follows:

The RFID reader 102 may request an identifier from the RFID tag 906.

The RFID reader 102 may pass the identifier to the blockchain node 404.

The blockchain node 404 may use the identifier to retrieve the transaction 942 from the blockchain 940, and may extract the first password P[1] 542 from the transaction 942.

The blockchain node 404 may retrieve the data array Q[ ] 1102 from the transaction 1202, and may verify that the first password P[1] 542 is a valid password by checking that applying a hash function to the first password P[1] 542 produces an element of the data array Q[ ] 1102. Typically this will be a first element Q[1] of the data array Q[ ] 1102.

The blockchain node 404 may then return the first password P[1] 542 to the RFID reader 102.

The RFID reader 102 may use the first password P[1] 542 to access a memory sector of the RFID tag 906 to retrieve a corresponding first data entry D[1] from the RFID tag 906.

The RFID reader 102 may verify that applying a hash function to the first data entry D[1] produces the first password P[1] 542, thereby performing one-way authentication of the RFID tag 906.

In some embodiments a successful one-way authentication may be published on the blockchain, and may be conducted by verifying that a data entry retrieved from a memory sector may be transformed into a password used to access the data entry by application of a hash function, and by verifying that the password may be transformed into an element within a data array published on the blockchain.

Those skilled in the art will appreciate that the above method may be applied multiple times using a new password, a new data entry and a new element from the data array.

The devices described above may each be implemented through a system comprising one or a plurality of: general purpose microprocessors, digital signal processors (DSPs), application specific instruction set processors (ASIPs), field programmable gate arrays (FPGAs), dedicated application specific integrated chips (ASICs), or other equivalent integrated or discrete logic circuitry and peripheral circuitry, connected to a tangible storage medium containing instructions that, when executed, effect methods and techniques described below. The techniques additionally, or alternatively, may be realized at least in part by a computer-readable communication medium or record carrier that carries or communicates code in the form of instructions or data structures and that can be accessed, read, and/or executed by a computer.

The technology described herein is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX® or Microsoft Windows®.

The system may be written in any conventional programming language such as C, C++, Pascal, or Java, and ran under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp. The system may also be written in a custom programming language specific to device architectures employed, or in machine code.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, programmable logic controller (PLC), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor or programmable logic controller, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes reliably and securely determining the identity by one-way authentication of a low power RFID tag using a one-time password pad and a blockchain.

What is claimed is:

1. A system for one-way authentication of an RFID tag comprising:
   the RFID tag comprising:
   an identifier;
   a memory sector;
   a preimage stored in the memory sector; and
   an access key to the memory sector, the access key being derived from the preimage;
   and a blockchain comprising:
   a record indexed by the identifier, said record comprising the access key;
   and an RFID reader configured to carry out steps comprising:
   retrieving the identifier from the RFID tag;
   using the identifier to retrieve the access key from the blockchain;
   retrieving the preimage from the memory sector of the RFID tag using the access key; and
   authenticating the RFID tag by verifying that the access key is derived from the preimage.

2. The system of claim 1, wherein the RFID reader is further configured to:
   in response to authenticating the RFID tag, publish a transaction comprising the access key and the preimage on the blockchain.

3. The system of claim 2, wherein the RFID tag further comprises:
   a plurality of triads, each triad comprising a memory sector, a preimage stored in the memory sector and an access key derived from the preimage.

4. The system of claim 3, further comprising:
a monitor, comprising a list of access keys from the plurality of triads, and wherein the monitor is configured to carry out steps comprising:
  detecting, on the blockchain, a transaction comprising the access key from the list of access keys and a corresponding preimage; and
  after a predetermined delay, publishing a new record on the blockchain, the new record comprising: the identifier and a previously unpublished access key from the list of access keys.

5. The system of claim 4, wherein the monitor is a smart contract running on the blockchain.

6. The system of claim 4, wherein the monitor is a blockchain node.

7. The system of claim 5, wherein the smart contract is configured to publish the new record in encrypted form, and wherein a decryption key for the new record is released to the RFID reader on receipt of a cryptocurrency payment to the smart contract.

8. The system of claim 4, wherein the RFID tag further comprises a counter, and the RFID tag is further configured to increment or decrement the counter each time a new memory sector from the plurality of triads is read for a first time using a corresponding access key from the plurality of triads.

9. The system of claim 8, wherein the transaction further comprises a value of the counter.

10. A method for one-way authentication of an RFID tag comprising:
  storing an identifier in a first memory area and a preimage in a second memory area on an RFID tag;
  protecting access to the second memory area with an access key derived from the preimage;
  writing a record indexed by the identifier and comprising the access key to a blockchain;
  retrieving the identifier from the RFID tag;
  using the identifier to retrieve the access key from the blockchain;
  retrieving the preimage from the second memory sector of the RFID tag using the access key; and
  authenticating the RFID tag by verifying that the access key is derived from the preimage.

11. The method of claim 10, further comprising:
in response to authenticating the RFID tag, publishing a transaction comprising the access key and the preimage on the blockchain.

12. The method of claim 11, further comprising:
generating a plurality of preimages and access keys;
storing each preimage from the plurality of preimages and access keys in one of a plurality of memory sectors; and
protecting each memory sector of the plurality of memory sectors with an access key from the plurality of preimages and access keys corresponding to the preimage from the plurality stored in the memory sector.

13. The method of claim 12, further comprising:
detecting, on the blockchain, a transaction comprising the access key from the plurality of preimages and access keys and a previously unpublished preimage from which the access key is derived; and
after a predetermined delay, publishing a new record on the blockchain, the new record comprising: the identifier and an unpublished access key from the plurality of access keys and preimages.

14. The method of claim 13, further comprising:
publishing the new record in encrypted form; and
releasing a decryption key for the new record on receipt of a cryptocurrency payment.

15. A method for ensuring a validity of a one-time password pad used for one-way authentication of an RFID tag comprising:
  generating a data array wherein each element of the data array is derived from a corresponding password from the one-time password pad by applying a hash function to the corresponding password;
  publishing the data array on a blockchain;
  publishing an entry from the one-time password pad on the blockchain;
  retrieving the entry and the data array from the blockchain;
  applying the hash function to the entry to produce an output; and
  confirming that the data array comprises an element equal to the output.

16. The method of claim 15, further comprising:
deriving the one-time password pad from a hash chain using a second hash function.

17. The method of claim 15, further comprising:
publishing a confirmation transaction on the blockchain, wherein the confirmation transaction comprises an identifier for the RFID tag, the entry, and the element.

* * * * *